United States Patent [19]

Scott et al.

[11] 3,923,953

[45] Dec. 2, 1975

[54] METHOD OF MOLDING POLYMERS

[75] Inventors: Harvey Scott, Blackwood; Peter E. D. Morgan, Cherry Hill, both of N.J.

[73] Assignee: The Franklin Institute Research Laboratories, Philadelphia, Pa.

[22] Filed: June 23, 1972

[21] Appl. No.: 265,661

Related U.S. Application Data

[63] Continuation of Ser. No. 855,754, Sept. 5, 1969, abandoned.

[52] U.S. Cl.......... 264/325; 260/47 CP; 260/78 TF; 264/331
[51] Int. Cl.............................................. C08g 20/32
[58] Field of Search .......... 264/331, 126, 322, 101, 264/102, 109, 122, 236, 325, 320; 260/47 CP, 78 TF

[56] References Cited
UNITED STATES PATENTS

| | | | |
|---|---|---|---|
| 3,340,325 | 9/1967 | Suffredini | 264/126 |
| 3,428,602 | 2/1969 | Haller | 264/331 |
| 3,575,924 | 4/1971 | Bargain | 264/331 |
| 3,654,227 | 4/1972 | Dine-Hart | 260/47 CP |
| 3,666,528 | 5/1972 | Barnhardt | 264/311 |

FOREIGN PATENTS OR APPLICATIONS 1,094,251  12/1967  United Kingdom............ 260/47 CP

OTHER PUBLICATIONS

An Exploratory Study of a New Class of Stepladder and Ladder Polymers–polyimidazopyrrolones – Nasa Tech. D–3148, Bell et al.

*Primary Examiner*—Jeffery R. Thurlow
*Attorney, Agent, or Firm*—Howson and Howson

[57] ABSTRACT

In the solid state polymerization of monomeric material to intractable polymer there is provided a method, whereby the otherwise intractable polymer may be produced in the desired molded shape, wherein the monomeric material, in dry, solid, finely-divided form, is heated from a temperature below melting temperature up to and through the polymerization temperature while held under substantial mechanical pressure in a confined molding zone adapted to permit the escape of gases evolved during the heating.

11 Claims, No Drawings

METHOD OF MOLDING POLYMERS

This application is a continuation of our co-pending parent application Ser. No. 855,754, filed Sept. 5, 1969, now abandoned.

Polymer intractability is a severe handicap which has complicated attainment of optimum useful properties of most polyheterocyclic and other thermally stable polymers prepared in recent years to meet high thermal stability and other high performance requirments for aircraft, rockets, space capsules, electrical insulation, and the like. In some cases, such as with the commercially available polyimides, polybenzimidazols and polyimidazopyrrolones (pyrrones) which have outstanding resistance to high energy radiation and thermal degradation, a low molecular weight prepolymer can be first made in solution in a solvent, such as dimethylacetamide. The solution is then cast into a film and cured at elevated temperatures. Or the prepolymer may be precipitated with a non-solvent to yield a powder which can be molded and cured at elevated temperature. With the latter procedure in particular, however, it is difficult to avoid retention of some solvent and a loss in stoichiometry of reactive groups due to selective precipitation of the more insoluble prepolymer fractions. Although retention of solvent is undesirable because it facilitates degradative reactions, and permeation of oxygen, and contributes to a higher volatile content and consequent higher flammability, solvent retention is often necessary to avoid premature conversion of the prepolymer to an intractable material prior to or during molding.

The solid state polymerization of dry, finely-divided solid monomeric materials is known. For example, mixtures of tractable monomers have been heated to provide a mass of intractable polymeric material. The resulting polymer, however, could not be worked or shaped further.

It is the principal object of the present invention to provide a novel method for making shaped bodies of otherwise intractable polymers.

It is another principal object of the present invention to provide a method for forming shaped bodies of otherwise intractable polymers from solvent-free material.

It is a further object of the present invention to provide a method by which tractable monomeric material may be simultaneously molded and polymerized into strong, dense, therally stable shapes.

These and other objects will become apparent from a consideration of the following specification and claims.

The method of the present invention comprises, in the solid state polymerization of monomeric material to intractable polymer the improvement whereby the otherwise intractable polymer may be produced in a desired molded shape, wherein the monomeric material in dry, solid, finely-divided form, is heated from a temperature below melting temperature up to and through polymerization temperature while held under substantial mechanical pressures in a confined molding zone adapted to permit the escape of gases evolved during said heating.

The method of the present invention is particularly applicable to the formation of shaped bodies of polymers of the polyimidazopyrrolone (pyrrone) type. For making these polymers, the starting monomeric materials include a cyclic tetracarboxylic acid or its dianhydride, and a cyclic tetramine, or its tetrahydrochloride salt. Examples of typical cyclic tetracarboxylic acids or their anhydrides are pyromellitic dianhydride ("PMDA"); 1,2,5,8-naphthalene tetracarboxylic acid dianhydride ("NTDA"); and benzophenone tetracarboxylic acid dianhydride ("BDTA"). Typical cyclic tetramines are 3,3'-diamino benzidine ("DAB"); tetramino diphenyl ether ("TADPO"); tetramino benzene ("TAB") and bis-3,4-diamino phenylmethane.

The method is also applicable to the formation of shaped bodies of polymers of the polybenzimidazol type. the starting monomeric materials for these polymers include a cyclic dicarboxylic acid, usually aromatic, or its anhydride, and a cyclic tetramine or its hydrochloride salt as exemplified above. Typical dicarboxylic acids are isophthalic acid, terephthalic acid and 2,6-naphthalene dicarboxylic acid.

The method is also applicable to the formation of shaped bodies of polymers of the polyimide type. The starting monomeric materials for making these polymers include a cyclic dianhydride and a diprimary aromatic amine. Examples of dianhydrides used are pyromellitic dianhydride (PMDA); 2,3,6,7-naphthalene tetracarboxylic acid dianhydride; 1,2,5,6-naphthalene tetracarboxylic acid dianhydride; 3,3',4,4'-diphenyltetracarboxylic acid dianhydride; 2,2',3,3'-diphenyltetracarboxylic acid dianhydride; thiophene-2,3,4,5-tetracarboxylic acid anhydride; 2,2-bis (3,4-biscarboxyphenyl) propane dianhydride ("PPDA"); 3,4-dicarboxyphenyl sulfone dianhydride; perylene-3,4,9,10-tetracarboxylic acid dianhydride; bis (3,4-dicarboxy phenyl) ether dianhydride ("PEDA"); and 3,4,3',4'-benzophenonetetracarboxylic dianhydride (BDTA). Examples of diamines are m-phenylenediamine ("MPD"); p-phenylenediamine ("PPD"); 2,2-bis(4-aminophenyl) propane ("DDP"); 4,4'-methylenediani-line ("DDM"); benzidine ("PP"); 4,4'-diaminodiphenyl sulfide ("PSP"); 4,4'-diaminodiphenyl sulfone ("PSO₂P"); 4,4'-diaminodiphenyl ether ("POP"); 1,5-diaminonaphthalene; 3,3'-dimethylbenzidine; 3,3'-dimethoxybenzidine; 2,4-bis (β-amino-tert-butyl)toluene; bis(4-β-amino-tert-butyl phenyl) ether; 1,4-bis(2-methyl-4-aminopentyl)benzene; 1-isopropyl-2,4-phenylenediamine; m-xylylenediamine; p-xylylenediamine; di-(4-aminocyclohexyl)methane.

The monomeric material need not be a mixture of different monomers, such as a mixture of one or more polyamines and of one or more polycarboxylic acids or anhydrides. A single monomer containing both amino groups and carboxylic groups may be utilized. Likewise, an initial addition product of one or more polyamines and one or more polycarboxylic acids or anhydrides may also be used as the starting material and such product is included herein within the term "monomer", "monomer material", etc. This includes salt adducts of one or more polyamines and of one or more polycarboxylic acid.

In accordance with the present invention the starting material is the appropriate monomer material in dry (solvent-free), solid, finely-divided form. Thus, the starting material preferably has a particle size less than 10 mesh. Milling, as in a ball mill may be used. Blending of two finely-divided monomers, as by dispersion in a non-solvent liquid and high speed blending followed by evaportaion of the liquid is another method that may be employed. Freeze drying of a solution of the mixed monomers provides the most intimate dispersion.

In any event, in accordance with the present invention, the monomeric material, including a mixture of monomers, in dry, solid, finely-divided form is placed in a confined molding zone or die cavity. Then, while substantial mechanical pressure is applied, the material is heated. Initially the material will be below the melting temperature of it or the components in the case of a mixture, and usually the initial temperature before heating is commenced is about room temperature. The material, in the confined molding zone and while under mechanical pressure, is then heated. While, as will appear hereinafter, the particular rate of temperature rise employed may depend upon various factors, it is generally in the range of from about 1 to about 20°C. per minute, preferably from about 2° to about 10°C. per minute. The heating rate may be substantially constant to provide a substantially constant rate of temperature rise, or the heating rate may be increased or decreased periodically to control the degree of fluidity, due to melting, versus the rate of polymerization which solidifies the material. Too much fluidity may cause the material to squeeze out the molding zone and too little fluidity may reduce densification. The material is heated to and through the polymerization temperature of the particular material employed, for instance to about 450°C. – 500°C. Advantageously, the material is also held at about the maximum temperature reached for a brief period, which may range from about one-half to about 2 hours, to insure completion of the reaction.

Throughout at least the major portion of the heating and temperature rise, substantial mechanical pressure is applied to the material within the confined molding zone. This pressure is generally at least about 1000 psi. and may go up to about 10,000 psi. providing other conditions and factors are such, as discussed hereinafter, that the material in at least partly molten or viscous form is not forced out of the confined molding zone. A constant mechanical pressure may be applied. On the other hand, since the material may undergo an abrupt momentary increase in shrinkage at a temperature level in the neighborhood of the softening or melting point of the material or of each component in the case of a mixture, it is often desirable to decrease the applied pressure at this point or points. Thus, the pressure applied during the heating cycle may be varied to provide a substantially constant rate of shrinkage (substantially linear shrinkage as a function of time and temperature). This may mean that at a particular temperature level the pressure may for a time be reduced to a low value but is then increased when this level is passed.

Since the polymerization involves condensation reactions, gaseous materials, like water vapor and carbon dioxide, are evolved during the heating cycle. It is one of the important features of the present invention that these gases be permitted to escape substantially as fast as formed. This may be accomplished by adapting the mold cavity to permit the escape of gases, as by making walls of the mold cavity of an inert, gas permeable material, like porous graphite.

The effects of pressure and rate of rise of temperature are complex and interdependent. For example, polymerization itself is most directly dependent on rate of temperature rise while densification is related both to the rate of polymerization and to the applied pressure. For a given pressure, too rapid a rate of temperature rise may cause melting of monomers or low oligomers which have not sufficiently polymerized in the time avaialble. Too slow a rate of temperature rise may cause slow polymerization but leave insufficient monomer and low oligomers at the higher temperatures to plasticize the material. Similarly for a given rate of temperature rise too high a pressure may cause squeezing out of the confined molding zone, and too low a pressure, insufficient densification. Optimum conditions for maximum densification may not always be necessary. The most desirable conditions for any particular desired result with a particular system can best be determined empirically.

For the mixture of PMDA and DAB, the optimum rate of rise in temperature appears to be from about 3.5° to about 8°C. per minute, depending upon the particular manner of mixing the monomers, and the optimum pressure employed appears to range from about 3500 to about 7000 psi., also depending upon the particular manner of mixing the monomers.

The present invention will be more readily understood from a consideration of the following specific examples which are given for the purpose of illustration only and are not to be considered as limiting the scope of the invention in any way.

EXAMPLE 1

Coarse granular 3,3'-diaminobenzidine (DAB) is ball-milled, using alumina balls, until finely ground. It is then well mixed with an equimolar amount of pyromellitic dianhydride (PMDA) in a ball mill without balls. The resulting powder is loaded into a stainless steel cylindrical die body lined with porous graphite to an inside diameter of three-fourths. Pressure is applied at 4000 psi. through stainless steel punches and the die body is heated, from room temperature to 450°C., at the rate of 5°C. per minute and held at this temperature for 1 hour. Gases evolved during the reaction escape through the graphite lining. Polymerization, shrinkage and densification of the material proceed rapidly at about 150°C. and again at about 250°C. (m.p. of pure DAB is 172°C. and of pure PMDA is 286°C). The resulting polyimidazopyrrolone, in the form of a dark orange-brown, hard, flat, cylindrical pellet (3/4 inches diameter by 1/4 inches thick) is removed after cooling and releasing the pressure.

Infrared absorption spectra of a sample of the polymer ground and dispersed in KBr, using a Perkin-Elmer Model 521 Spectrometer, produces an IR spectrum essentially the same as that of polyimidazopyrrolone prepared by molding the corresponding prepolymer under the same conditions, although carbonyl absorption at $5.43\mu$ is less intense for the product of this example.

The tensile strength of the polymer of this example is 13,000 psi. as determined by the diametral method. Its density, determined by liquid displacement, is 1.25g/cc., and it has a micro-hardness of $56 kg/mm^2$ (Knoop Scale, 100g. load). The material is too hard and brittle for macro-hardness measurements on the Rockwell E scale normally used for the hardest plastics.

The material is insoluble in cold sulfuric acid, dimethylsulfoxide and dimethylacetamide. Thermogravimetric analyses, with a duPont 950 Analyzer (0.97 mg., 10°C./min., $N_2$ atmosphere) shows a 30% weight loss up to 1000°C. including 6% loss at low temperature (to about 390°C.) which probably represents atmospheric water, reversibly absorbed. Aside from this low temperature 6% loss there was no weight loss to 600°C.

Using the procedure of this example, but a pressure of 3500 psig. and a heating rate of 4.5°C./min. has resulted in polyimidazopyrrolone products having a density of 1.15g/cc and a strength of 20,000 psi., and, at a pressure of 5000 psig. and a heating rate of 4.5°C./min., products having a density of 1.23 g/cc. and a strength of 19,000 psi. have been made.

EXAMPLE 2

The procedure of Example 1 is followed except that the initial monomer mixture is prepared by blending the mixed monomer powders, suspended in cyclohexane, in a Waring blender, followed by evaporation of the cyclohexane.

Pressures in the range of 4000–6000 psi. and heating rates in the range of 4°–6°C./min. are used during molding.

EXAMPLE 3

The procedure of Example 1 is followed except that the monomer mixture is prepared as follows: 3.4g. of PMDA are dissolved in 100 ml. pyridine and 3.2 g. of DAB are dissolved in a mixture of 170 ml. water and 80 ml. dioxane; the two solutions are mixed and the mixed solution is dripped into liquid nitrogen; and the frozen material is subjected to vacuum at 0°C. to evaporate the solvents. In this way the droplets freeze instantly, each monomer remains in solid solution as a molecular mixture without being permitted selectively to crystallize.

Pressures in the range of 5000–7000 psi. and heating rates in the range of 5°–8°C. are employed during molding.

EXAMPLE 4

The procedure of Example 1 is followed except that equimolar quantities of DAB and of 1,2,5,8-naphthalene tetracarboxylic acid dianhydride (NTDA) are employed to form poly (bis-benzimidazobenzophenanthroline ("BBB"). A pressure of 4000 psi. and a heating rate of 5°C./min. are used during molding. The product density is as high as 1.418g/cc.

The infrared spectrum and solubility, in concentrated sulfuric acid, of the product are similar to that of the polymer made by conventional methods. However, hitherto, this polymer, made in solution, could not be formed into useful products other than fibers.

EXAMPLE 5

The procedure of Example 1 is followed except that equimolar quantities of DAB and benzophenone tetracarboxylic acid dianhydride ("BTDA") are employed, and a pressure of 6000 psig. and a heating rate of 3.5°C./min. are used during molding.

EXAMPLE 6

In this example equimolar quantities of PMDA and DAB, blended in cyclohexane as in Example 2, are placed in the die as in Example 1 and heated from room temperature to 450°C. at the rate of 3.5°C./min. using, however, variable pressure in order to produce a straight shrinkage line (when change in sample length between the punches is plotted against temperature). The density of the resulting product is 1.24 g/cc.

EXAMPLE 7

In this example an equimolar mixture of PMDA and DAB, prepared as in Example 1, is treated as in Example 6, at a heating rate of 4.5°c./min., under variable pressure to provide a constant rate of shrinkage. The product has a density of 1.20 g/cc.

EXAMPLE 8

The procedure of Example 1 is followed except that the tetrahydrochloride salt of tetraaminobenzene (TAB) and PMDA are used, with a pressure of 4000 psi. and a heating rate of 1.8°C./min. The product has a density of 1.45 g./cc.

EXAMPLE 9

The procedure of Example 1 is followed except that a 1:1 salt adduct of pyromellitic acid and DAB is used as the monomer material and heated at a rate of 20°C./min. with a pressure of 5,000 psi. The density of the resulting product is 1.30 g/cc. The adduct is prepared by dissolving an equimolar mixture of the pyromellitic acid and DAB in a mixture of methanol and water at the boiling point. The material that precipitated on cooling was collected and dried under vacuum at room temperature. Elemental analysis shows it to be the 1:1 adduct.

What is claimed is:

1. A method for producing shaped articles composed of intractable polymer by the simultaneous molding and substantially solid state polymerization of monomeric material which comprises introducing into a molding zone, solid, finely particulate, solvent-free monomeric material capable of being polymerized to intractable polymer by heat with the evolution of gas and being selected from the group consisting of (a) single self-polymerizable monomers, (b) mixtures of different copolymerizable monomers, and (c) salt adducts composed of different polymerizable monomers, heating said monomeric material in the absence of solvent in said zone from a temperature below the melting point up to and through the polymerization temperature of said monomeric material while holding the non-gaseous contents of said molding zone under mechanical pressure and permitting escape of evolved gasses from said zone, the pressure and rate of heating being sufficient to densify said polymer but insufficient to cause exudation of solid and liquid material from said molding zone.

2. The method of claim 1 wherein the pressure is at least 1000 psi. at least initially.

3. The method of claim 1 wherein the rate of heating provides a rate of temperature rise of from about 1 to about 20 C./minute.

4. the method of claim 1 wherein the pressure is varied to provide substantially linear shrinkage.

5. The method of claim 1 wherein the polymer is a polyimidazopyrrolone.

6. The method of claim 5 wherein the polyimidazopyrrolone is the polymer of 3,3'-diaminobenzidine and pyromellitic dianhydride.

7. The method of claim 5 wherein the polyimidazopyrrolone is the polymer of 3,3'-diaminobenzidine and 1,2,5,8-naphthalene tetracarboxylic acid dianhydride.

8. The method of claim 5 wherein the polyimidazopyrrolone is the polymer of 3,3'-diaminobenzidine and benzophenone tetracarboxylic acid dianhydride.

9. The method of claim 5 wherein the polyimidazopyrrolone is the polymer of tetraaminobenzene and pyromellitic dianhydride.

10. The method of claim 1 wherein the material that is polymerized and molded is a 1:1 salt adduct of the monomers.

11. The method of claim 1 wherein the material that is polymerized is a 1:1 salt adduct of pyromellitic acid and 3,3'-diaminobenzidine.

* * * * *